United States Patent
Camps Mur et al.

(10) Patent No.: US 9,204,384 B2
(45) Date of Patent: Dec. 1, 2015

(54) METHOD FOR OPERATING A MOBILE TERMINAL AS ACCESS POINT AND MOBILE TERMINAL

(75) Inventors: Daniel Camps Mur, Darmstadt (DE); Xavier Perez Costa, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 166 days.

(21) Appl. No.: 13/389,323

(22) PCT Filed: Aug. 6, 2010

(86) PCT No.: PCT/EP2010/004828
§ 371 (c)(1),
(2), (4) Date: Apr. 19, 2012

(87) PCT Pub. No.: WO2011/015370
PCT Pub. Date: Feb. 10, 2011

(65) Prior Publication Data
US 2012/0195193 A1    Aug. 2, 2012

(30) Foreign Application Priority Data

Aug. 7, 2009    (EP) .................................... 09010254

(51) Int. Cl.
*H04L 1/00* (2006.01)
*H04W 52/02* (2009.01)
*H04W 36/22* (2009.01)
*H04W 88/08* (2009.01)

(52) U.S. Cl.
CPC .......... *H04W 52/0206* (2013.01); *H04W 36/22* (2013.01); *H04W 88/08* (2013.01)

(58) Field of Classification Search
USPC .......... 370/311, 338, 468; 455/419, 411, 574; 713/320; 375/219
See application file for complete search history.

(56) References Cited

U.S. PATENT DOCUMENTS

| | | | |
|---|---|---|---|
| 7,505,795 B1* | 3/2009 | Lim et al. ...................... | 455/574 |
| 2006/0039345 A1 | 2/2006 | Perez-Costa | |
| 2006/0140215 A1* | 6/2006 | Fleming ...................... | 370/468 |

(Continued)

FOREIGN PATENT DOCUMENTS

| | | |
|---|---|---|
| CN | 1738216 A | 2/2006 |
| CN | 101036061 A | 9/2007 |

(Continued)

OTHER PUBLICATIONS

International Search Report dated Nov. 12, 2010, corresponding to PCT/EP2010/004828.
Terence D. Todd, et al.; "The need for access point power saving in solar powered WLAN mesh networks"; vol. 22, No. 3, May 1, 2008; pp. 4-10.
Ahmad M. Kholaif, et al.; NET 11-3-QoS-Enabled Power Saving Access Points for IEEE 802.11e Networks; Wireless Communications and Networking Conference; Mar. 31, 2008; pp. 2331-2336.

(Continued)

*Primary Examiner* — Andrew Lai
*Assistant Examiner* — Jamaal Henson
(74) *Attorney, Agent, or Firm* — Young & Thompson

(57) ABSTRACT

A method for operating a mobile terminal as access point, wherein the access point composes a network together with one or more associated client stations, wherein the access point has an operational mode of alternating awake and sleep periods, and wherein the access point broadcasts beacon frames at regular intervals for signaling communication parameters to the associated client stations, is characterized in that the access point, based on the level of activity in the network, adjusts the communication parameters by slowing down or accelerating the access of the associated client stations to the network. Furthermore, a corresponding mobile terminal is disclosed.

20 Claims, 3 Drawing Sheets

(56) References Cited

U.S. PATENT DOCUMENTS

Figure 1:
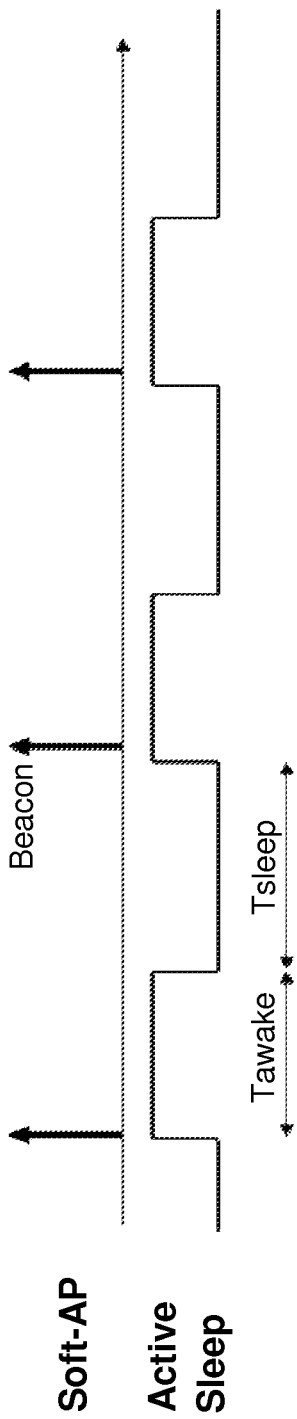

| | | | |
|---|---|---|---|
| 2007/0237104 A1* | 10/2007 | Alon et al. | 370/311 |
| 2008/0186945 A1* | 8/2008 | Ahn | 370/349 |
| 2009/0005005 A1* | 1/2009 | Forstall et al. | 455/411 |
| 2010/0008276 A1* | 1/2010 | Kopikare et al. | 370/311 |
| 2010/0008277 A1 | 1/2010 | Kopikare et al. | |
| 2010/0296501 A1* | 11/2010 | Unbehaun | 370/338 |
| 2011/0019721 A1* | 1/2011 | Diener et al. | 375/219 |

FOREIGN PATENT DOCUMENTS

| | | | |
|---|---|---|---|
| CN | 101395844 A | 3/2009 | |
| JP | 2011527866 A | 11/2011 | |
| JP | 2011527867 A | 11/2011 | |
| WO | 2007/092424 A1 | 8/2007 | |

OTHER PUBLICATIONS

Niveditha Sundaram, et al.; "Engergy Efficient Communication in Multi-Radio PANs"; Global Telecommunications Conference; Nov. 30, 2008; pp. 1-6.

Wi-Fi Alliance: "WMM Power Save for Mobile and Portable Wi-Fi Certified Devices"; Dec. 1, 2005; pp. 1-13.

Zhang et al., "Power Saving Access Points for IEEE 802.11 Wireless Network Infrastructure", IEEE Transactions on Mobile Computing, 2006, vol. 5, No. 2, pp. 144-156.

Japanese Office Action, dated Jan. 23, 2013, from corresponding JP application.

Chinese Office Action, dated Dec. 13, 2013, from corresponding Chinese application.

* cited by examiner

METHOD FOR OPERATING A MOBILE TERMINAL AS ACCESS POINT AND MOBILE TERMINAL

BACKGROUND OF THE INVENTION

1. Field of the Invention

The present invention relates to a method for operating a mobile terminal as access point, wherein said access point composes a network together with one or more associated client stations, wherein said access point has an operational mode of alternating awake and sleep periods, and wherein said access point broadcasts beacon frames at regular intervals for signaling communication parameters to said associated client stations.

Furthermore, the invention relates to a mobile terminal, said terminal being operated as access point, wherein said access point composes a network together with one or more associated client stations, wherein said access point performs alternating awake and sleep periods, and wherein said access point broadcasts beacon frames at regular intervals for signaling communication parameters to said associated client stations.

2. Description of the Related Art

In recent years it has become commonly known to operate wireless or handheld devices, like e.g. mobile phones, laptops, cameras or tablets, in such a way that they act as access point (AP) in order to be able to make a one-to-one connection to a client terminal, or a group of several client terminals can connect simultaneously. Consequently, while traditionally the Wi-Fi technology has been mainly employed to provide internet connectivity by means of an access point serving a set of associated client stations, there is currently a trend in the Wi-Fi industry to consider every time more direct device to device connectivity.

A typical application scenario would be, for instance, a mobile terminal directly communicating, without the presence of an access point, to another mobile terminal, a printer, a digital camera or a display. One solution to this technical problem is to design devices that can support dual AP/client functionalities. In the following this technology is referred to as Soft-AP. According to this technology, a mobile terminal would act as a regular client in the presence of an access point, but when there is no access point present the mobile terminal would make itself appear as a traditional access point to establish communication with other devices, for instance a camera, a printer or a display.

Another possibility is to make use of the IBSS (Independent Basic Service Set) functionality—ad-hoc mode—defined in the IEEE 802.11 standard. However, a disadvantage of this approach in front of the Soft-AP solution is that many devices already existent in the market do not support the IBSS mode, for instance some Wi-Fi cameras. This problem does not exist in the Soft-AP solution because legacy devices simply see the Soft-AP mobile terminal as a traditional access point.

However, when the Soft-AP technology is applied to a mobile terminal a critical problem appears related to power consumption. In contrast to conventional stationary base stations, which are noncritical in terms of energy supply as they are constantly plugged to the power, in the case of mobile terminals the problem arises that they are typically battery-powered and, acting as access points, quickly drains the batteries of the devices. The reason is that the Wi-Fi protocol is designed based on the assumption that the access point is all the time awake and listening to the channel. Consequently, keeping the WLAN radio on results in a drastic reduction of battery time in the case of mobile terminals.

Therefore, all such devices need to be power efficient when acting as access points. However, setting a wireless terminal that acts as access point, e.g. as Wi-Fi access point, into a sleep state in order to save power, comes along with the risk of causing degradation on the Quality of Service (QoS) experienced by the connected clients. For example, switching the radio on and off has the risk of missing data packet transmissions in the uplink if the associated stations transmit data packets when the access point's radio is switched off. This heavily degrades user experience if some critical packets, for instance a TCP SYN initiating the connection to download a web page, are lost.

SUMMARY OF THE INVENTION

It is therefore an object of the present invention to improve and further develop a method and a mobile terminal of the initially described type in such a way that, by employing mechanisms that are readily to implement, an efficient and flexible power saving is achieved for the mobile terminal that acts as access point, without significantly degrading the performance and QoS experienced by the connected client terminals.

In accordance with the invention, the aforementioned object is accomplished by a method comprising the features of claim 1. According to this claim, such a method is characterized in that said access point, based on the level of activity in said network, adjusts said communication parameters by slowing down or accelerating the access of said associated client stations to said network.

Furthermore, the aforementioned object is accomplished by a mobile terminal comprising the features of claim 12. According to this claim, such a mobile terminal is characterized in that said access point, based on the level of activity in said network, adjusts said communication parameters by slowing down or accelerating the access of said associated client stations to said network.

The invention takes into consideration that switching the radio on and off has the risk of missing data packet transmissions in the uplink if the associated stations transmit when the access points' radio is switched off. In this context, according to the invention it has first been recognized that the time that an associated station needs to retransmit an uplink packet can be increased with the effect of reducing the probability that the associated station drops the packet while the access point is in a sleep mode. Specifically, it has been recognized that this effect can be accomplished by the access point that adjusts the communication parameters by slowing down or accelerating the access of the associated client stations to the network depending on the level of activity in the network. By doing this, an efficient and flexible power saving is achieved for the mobile terminal functioning as access point without significantly degrading the performance and QoS experienced by the connected client stations.

According to a preferred embodiment the level of activity in the network may be detected by the access point, which is the entity that is aware of the entire communication with associated client terminals—uplink and downlink—anyway. Insofar, although possible, there is no need for implementing an additional entity that measures the level of activity in the network.

According to a further preferred embodiment the access point may be configured to enter into the operational mode of alternating awake and sleep periods in case the level of activity in the network is below a configurable threshold. By regulating this threshold a more or less aggressive reduction of power consumption may be achieved. The threshold can be also configured in such a way that the access point enters into the operational mode of alternating awake and sleep periods only in case there is no activity in the network at all for a given time period.

Additionally, it may be provided that the level of activity in the network has to be below the above mentioned threshold for a configurable period of time, before the access point enters the operational mode of alternating awake/sleep periods. On the one hand, a short period of time induces a higher reduction in terms of power consumption, but increases the probability of missing data packets. On the other hand, a long period of time reduces the risk of missing data packets because the transmission of further data packets from associated client stations becomes increasingly unlikely, but the power consumption of the access point is higher in contrast to a short period of time.

Advantageously, the access point may be configured to stay in an awake state for a configurable period of time without any activity in the network. Thereby, the probability of missing a transmitted data packet may be further reduced. After that configurable period of time without sensing any traffic the access point may return to the alternate awake/sleep mode again.

According to a specific embodiment the communication parameters that are contained in the beacons broadcasted by the access point may include but are not limited to the contention window, data rate and/or a number of retransmissions. In such case the access point may adjust any or a combination of the parameters, for example the contention window, in order to slow down or accelerate the access of the associated client stations to the network. The communication parameters may be broadcasted in the beacon frame in the form of a QoS configuration that slows down the access to the network. A slow QoS configuration may increase statistically the retransmission timeouts of the associated client stations. By doing so, the probability that one of the retransmissions happens when the access point is in the awake state may be in turn increased.

Advantageously the associated client stations may be configured to support the Wi-Fi Wireless MultiMedia (WMM) specification. WMM is the QoS certification of the Wi-Fi Alliance. In the WMM specification the access point can control the QoS parameters, e.g. the contention window, employed by the associated stations. Hence, the access point has the means to control the time employed by an associated client station to drop a packet. Nowadays, 25% of the Wi-Fi certified devices in the market that are not access points are WMM certified. Thus, by configuring the associated client stations to support the WMM specification, the communication parameters defined by WMM may be therefore the ones that are used by the method according to the present invention.

According to a specific embodiment the access of the associated client stations to the network is slowed down in case the access point enters into the operational mode of alternating awake and sleep periods. This has the effect of increasing the time that an associated station needs to retransmit an uplink packet. Hence, the probability that the associated station drops a packet while the access point is in a sleep period or rather in the sleep mode is reduced.

Advantageously, the access of the associated client stations to the network may be accelerated as soon as activity in the network is detected. By this means the probability that transmitted data packets are missed can be further reduced.

With respect to reducing the probability of loosing sporadic transmissions from the associated stations when being in sleep mode, the access point may be configured to switch between at least two operational modes with different access configurations for the associated client stations to the network. Thereby, the access point controls the way client stations access the network by defining these different QoS configurations which may use standard WMM mechanisms. With a "no activity QoS configuration", the access point may slow down the access to the network of the associated stations. This has the effect of increasing the time that an associated station needs to retransmit an uplink packet, hence reducing the probability that the associated station drops the packet while the access point is in sleep mode. As soon as the access point detects that there is traffic in the network, the access point establishes or re-establishes a suitable QoS configuration, an "activity OoS configuration", in order to provide a good user experience.

According to a further preferred embodiment, as soon as activity in the network is detected, the access point may restore the communication parameters of the access configuration that had been employed before the access to the network was slowed down.

According to a further preferred embodiment the access point may be configured to support at least two different awake/sleep patterns with different lengths of the awake and sleep periods. For instance, the access point may be configured to support and/or switch between a moderate and an aggressive power saving strategy. Also a more finely scaled differentiation is conceivable. This provides a markedly positive effect on flexibility and enables an adaptation to consumer's needs.

BRIEF DESCRIPTION OF THE DRAWING FIGURES

Figure 2:
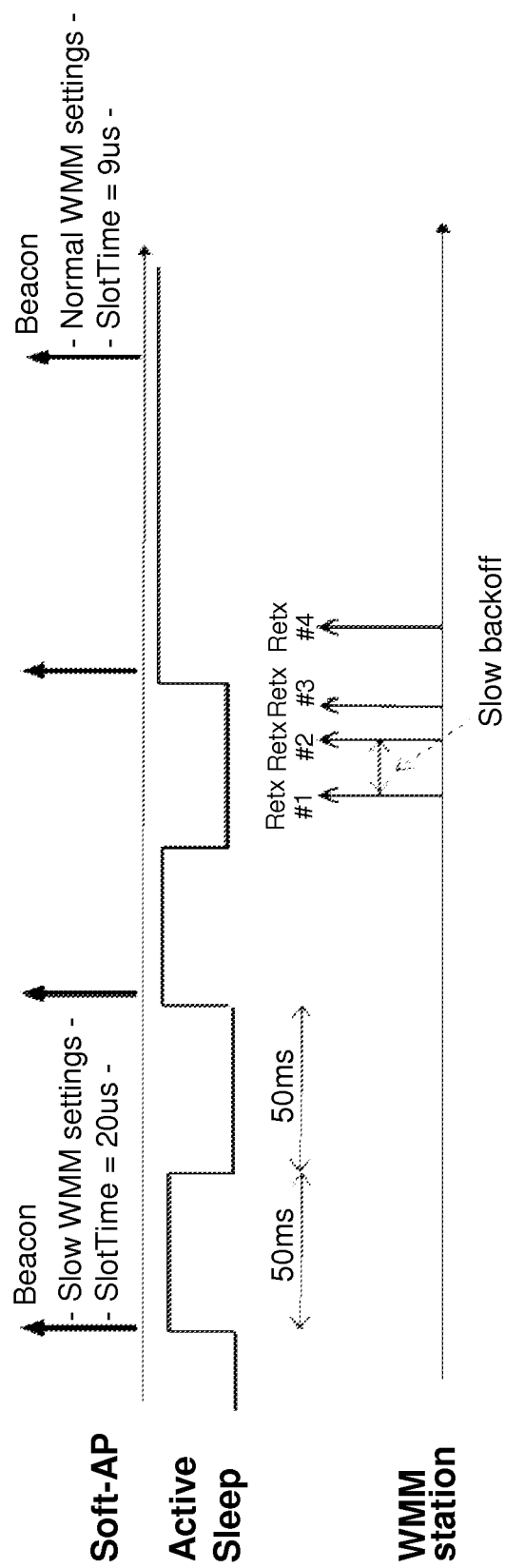
Figure 3:
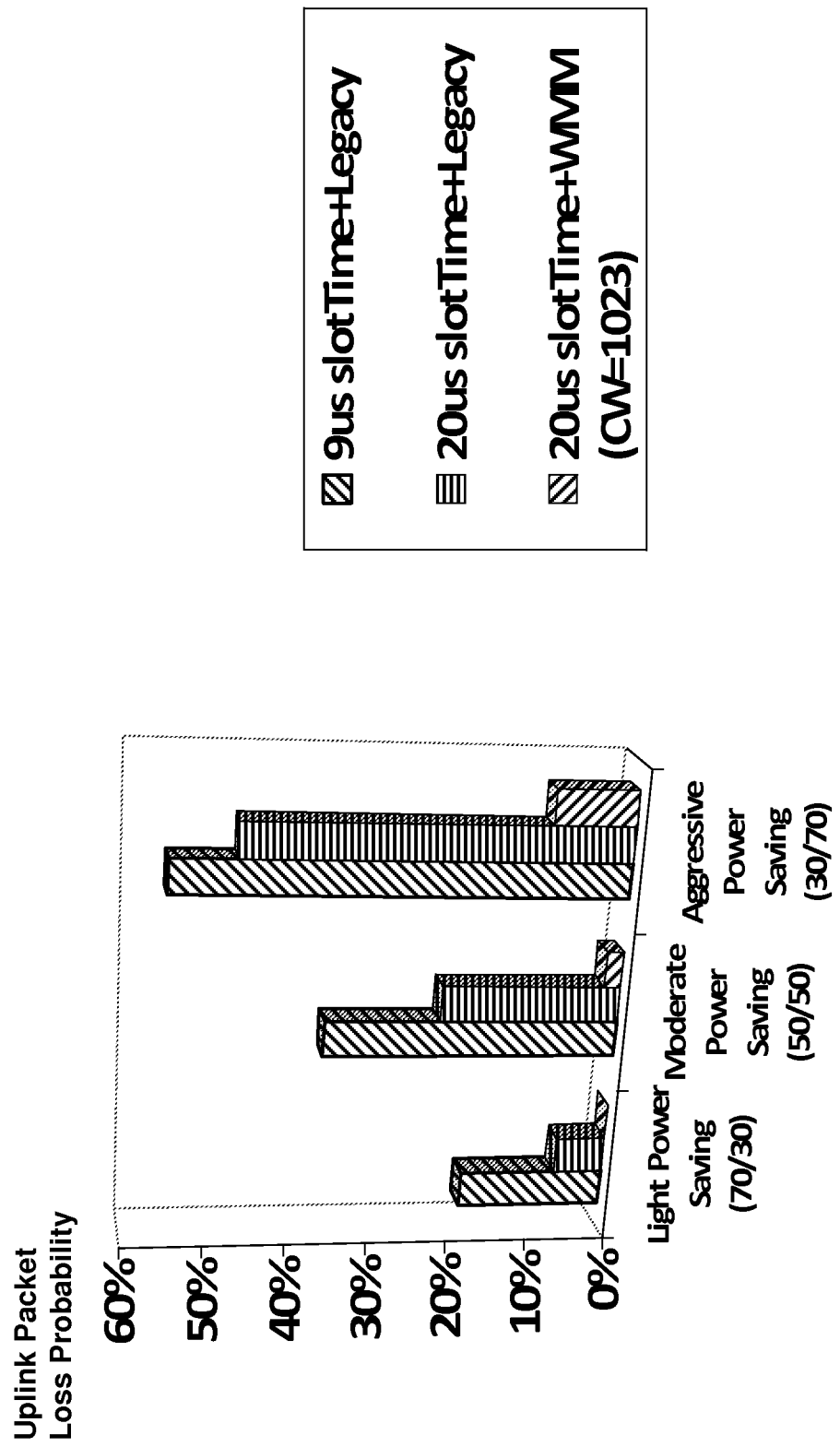

There are several ways how to design and further develop the teaching of the present invention in an advantageous way. In connection with the explanation of the preferred embodiments of the invention by the aid of the drawings, generally preferred embodiments and further developments of the teaching will be explained. In the drawings FIG. 1 is a schematic illustration of a power saving operational mode of an access point with alternating awake and sleep periods as applied by a method according to an embodiment of the present invention, FIG. 2 is a schematic illustration of an application scenario of a method according to an embodiment of the present invention, and FIG. 3 is a diagram illustrating the benefits of applying a method according to an embodiment of the present invention with different awake/sleep patterns.

DETAILED DESCRIPTION OF THE INVENTION

FIG. 1 shows a schematic illustration of a power saving operational mode applied by an access point. In FIG. 1 the access point is a mobile terminal which acts as access point, i.e. the mobile terminal implements dual AP/client functionality as software access point. In the following this access point is referred to as Soft-AP. The Soft-AP transmits beacon frames at regular intervals, as otherwise the associated stations would disassociate. Furthermore, the Soft-AP implements a mechanism to detect the level of activity in the network. If the Soft-AP detects that there is no activity in the network or the activity level is low, the Soft-AP reduces the power consumption by implementing alternating awake and sleep periods marked as Tawake and Tsleep in FIG. 1.

In the Soft-AP, switching the radio on and off has the risk of missing data packet transmissions in the uplink if the associated stations transmit when the Soft-AP's radio is switched off. From the viewpoint of an associated client terminal, the procedure of dropping a packet in a Wi-Fi network is the following. First, a retry limit is established which is typically set to 7 retries. After transmitting a packet and receiving no response the station doubles its contention window CW, and picks a random number, X, between 0 and 2*CW−1. After waiting X time slots the station retransmits again. If the packet is again lost the procedure repeats until the contention window reaches its maximum value CWmax. Thus, it is clear from the previous scheme that the time that a station needs to drop a packet is clearly determined by the initial value of its contention window CW.

Furthermore, it is to be noted that in WMM the Soft-AP can control the QoS parameters, e.g. the contention window CW, employed by the associated stations. Hence, the Soft-AP has the means to control how the traffic is sent in the network and consequently to control the time employed by an associated station to drop a packet. The method according to the present invention takes advantage of this effect in order to reduce the uplink loss probability while the Soft-AP's WLAN radio is switched off.

FIG. 2 is a schematic illustration of an application scenario of a method according to an embodiment of the present invention. FIG. 2 shows a mobile terminal acting as access point—Soft-AP—and an associated WMM station. The Soft-AP is configured to switch between two operational modes with two different access configurations for the associated WMM station to the network. The two different access configurations include a configuration having slow WMM settings with a slot time of 20 microseconds and big contention windows and a configuration having normal WMM settings with a slot time of 9 microseconds and smaller contention windows.

In the illustrated application scenario of FIG. 2 the Soft-AP alternates awake periods and sleep periods in order to save power when there is no activity in the network. In addition the Soft-AP broadcasts in the Beacon a QoS configuration that slows down the access to the network, e.g. a parameter CW=1023 for all Access Categories. The slow QoS configuration increases—statistically—the retransmission timeouts of the associated WMM station, which in turn increases the probability that one of the retransmissions happens when the Soft-AP is in the awake state. When the Soft-AP switches to the awake state and detects activity in the medium, the Soft-AP immediately restores the normal QoS configuration and stays in awake state waiting for more traffic from the associated WMM station. After some time without sensing traffic the Soft-AP returns to the alternate Awake/Doze state and again broadcast a slow QoS configuration. Thus, the embodiment of the present invention illustrated in FIG. 2 introduces a L2 mechanism compatible with legacy Wi-Fi WMM devices that can improve power saving in a mobile terminal acting as access point while at the same time reducing the probability of loosing uplink data transmissions.

FIG. 3 is a diagram illustrating the results of an evaluation of a method according to an embodiment of the present invention which was performed by means of simulations (OPNET). More specifically, an experiment was considered where a WMM station associated to a Soft-AP started several TCP connections and the ratio of lost packets (initial TCP SYNs) with and without applying a method according to the present invention was measured for different awake/sleep patterns.

In the diagram of FIG. 3, three different awake/sleep patterns are compared:
1) Light power saving where the Soft-AP stays awake 70 ms after a Beacon and then sleeps 30 ms until the next Beacon,
2) Moderate power saving where the Soft-AP stays awake 50 ms and sleeps 50 ms, and
3) Aggressive power saving where the Soft-AP stays awake 30 ms and sleeps 70 ms.

It is noticed that the aggressive power saving configuration 3) has the potential of reducing up to 70% the power consumption caused by the WLAN interface in the Soft-AP. Logically the probability of missing uplink transmissions increases when the Soft-AP increases its sleeping periods. However, in the presented experiment the proposed invention kept the loss probability below 10% even in the most aggressive configuration. It is noted that the proposed scheme can be configured to even further reduce the uplink loss probability by using even slower QoS settings.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a mobile terminal as an access point, said access point composing a network together with one or more associated client stations, the method comprising:
    alternating awake and sleep periods of an operational mode of said access point; and
    broadcasting, from said access point, beacon frames including communication parameters at regular intervals to said one or more associated client stations, the communication parameters including at least one of a contention window, a data rate, or a number of retransmissions,
    wherein said access point, based on a level of activity in said network, adjusts one or more of said communication parameters in order to slow down or accelerate the access of said associated client stations to said network, and
    wherein one or more of the communication parameters is adjusted by the access point such that a probability that a retransmission of the associated client stations occurs is increased, when the access point is in the awake state.

2. The method according to claim 1, wherein the level of activity in said network is detected by said access point.

3. The method according to claim 2, wherein said access point is configured to enter into said operational mode of alternating awake and sleep periods in case the level of activity in said network is below a configurable threshold for a predetermined period of time.

4. The method according to claim 1, wherein said access point is configured to enter into said operational mode of alternating awake and sleep periods in case the level of activity in said network is below a configurable threshold for a predetermined period of time.

5. The method according to claim 1, wherein said access point is configured to stay in an awake state for a configurable period of time without any activity in said network.

6. The method according to claim 1, wherein said associated client stations are configured to support a Wi-Fi Wireless MultiMedia (WMM) specification.

7. The method according to claim 1, wherein the access of said associated client stations to said network is slowed down in case said access point enters into said operational mode of alternating awake and sleep periods.

8. The method according to claim 1, wherein the access of said associated client stations to said network is accelerated as soon as activity in said network is detected.

9. The method according to claim 1, wherein said access point is configured to switch between at least two operational modes with different access configurations for said associated client stations to said network.

10. The method according to claim 1, wherein as soon as activity in said network is detected, said access point restores the communication parameters of an access configuration that was being employed before the access to said network was slowed down.

11. The method according to claim 1, wherein said access point is configured to support at least two different awake/sleep patterns with different lengths of the awake and sleep periods.

12. The method according to claim 1, wherein the access point has an AP/client functionality and acts as a software access point.

13. The method according to claim 1, wherein there are awake and sleep periods:
   i) light power saving where the access point stays awake 70 ms after a Beacon and then sleeps 30 ms until the next Beacon,
   ii) moderate power saving where the access point stays awake 50 ms and sleeps 50 ms, and
   iii) aggressive power saving where the access point stays awake 30 ms and sleeps 70 ms.

14. A mobile terminal, for executing the method according to claim 1 said terminal being operated as the access point,
   wherein said access point composes the network together with the one or more associated client stations,
   wherein said access point performs alternating the awake and sleep periods, and
   wherein said access point broadcasts the beacon frames including the communication parameters at regular intervals to said associated client stations,
   wherein said access point, based on the level of activity in said network, is configured to adjust at least one of said communication parameters in order to slow down or accelerate the access of said associated client stations to said network, and
   wherein one or more of the communication parameters is adjusted by the access point such that a probability that a retransmission of the associated client stations occurs is increased, when the access point is in the awake state.

15. A mobile terminal configured to operate as a software access point,
   wherein said software access point is configured to compose a network together with one or more associated client stations,
   wherein said software access point is configured to perform alternating awake and sleep periods of an operational mode of said access point,
   wherein said software access point is configured to broadcast beacon frames including communication parameters at regular intervals to said one or more associated client stations, said communication parameters including at least one of a contention window, a data rate, or a number of retransmissions,
   wherein said software access point, based on the level of activity in said network, is configured to adjust one or more of said communication parameters in order to slow down or accelerate the access of said associated client stations to said network, and
   wherein one or more of the communication parameters is adjusted by the software access point such that a probability that a retransmission of the associated client stations occurs is increased, when the software access point is in the awake state.

16. The mobile terminal according to claim 15, wherein the level of activity in said network is detected by said software access point.

17. The mobile terminal according to claim 15, wherein said software access point is configured to enter into said operational mode of alternating awake and sleep periods in case the level of activity in said network is below a configurable threshold for a predetermined period of time.

18. The mobile terminal according to claim 15, wherein said software access point is configured to stay in an awake state for a configurable period of time without any activity in said network.

19. The mobile terminal according to claim 15, wherein said associated client stations are configured to support a Wi-Fi Wireless MultiMedia (WMM) specification.

20. The mobile terminal according to claim 15, configured so that the access of said associated client stations to said network is slowed down in case said software access point enters into said operational mode of alternating awake and sleep periods.

* * * * *